United States Patent [19]

Kiesel

[11] 4,353,383
[45] Oct. 12, 1982

[54] SEISMICALLY ACTUATED VALVE RELEASE STRUCTURE

[76] Inventor: Donald F. Kiesel, 6801 Amador Valley Blvd., Dublin, Calif. 94566

[21] Appl. No.: 199,471

[22] Filed: Oct. 22, 1980

[51] Int. Cl.³ .............................................. F16K 17/36
[52] U.S. Cl. ..................................................... 137/45
[58] Field of Search .................................. 137/45, 46; 200/61.45 R, 61.52, 61.53

[56] References Cited

U.S. PATENT DOCUMENTS

| | | | |
|---|---|---|---|
| 3,927,689 | 12/1975 | Sharp | 137/45 |
| 4,103,697 | 8/1978 | Kiesow | 137/45 |

FOREIGN PATENT DOCUMENTS 5132 of 1914 United Kingdom .................. 137/45

*Primary Examiner*—Robert G. Nilson
*Attorney, Agent, or Firm*—Manfred M. Warren; Robert B. Chickering; Glen R. Grunewald

[57] ABSTRACT

A release structure is disclosed for automatically closing or opening a valve on the happening of an earthquake. The release structure includes a pendulum, which is biased upwardly against stop means formed for pivotal contact with an upper end of the pendulum, the stop means and the upper end having relatively small contact area. Biasing means urges a closure member within the valve toward an open or closed position, and the closure member is releasably retained against the urging of the biasing means by latch means. A member connecting the latch means to the pendulum provides a lever which urges the pendulum upward in response to the biasing means and which releases the latch means in response to vibrationally induced swinging motion of the pendulum.

11 Claims, 4 Drawing Figures

SEISMICALLY ACTUATED VALVE RELEASE STRUCTURE

BACKGROUND OF THE INVENTION

1. Field of the Invention

The invention relates to an improved structure for opening or closing a valve to control fluid flow therethrough in response to an earthquake.

2. Description of the Prior Art

After a sizable earthquake damage can be expected due to escaping water or flammable gas from ruptured pipes and pipe joints in residential and commercial buildings. Valves are known which respond, for example, to pressure differentials to seal off automatically the gas or water line if it should break. Such valves, however, do not respond to minor leaks such as might be expected at pipe fittings. Numerous other valves are known which are provided with mechanical relief structures for automatically sealing a pipe in response to seismic vibrations. The known release mechanisms suffer from a variety of drawbacks, such as complexity of construction, degeneration in the ability to respond after long periods of non-use, inconvenience in resetting the release mechanism, and oversensitivity to small vibrations. A particular drawback of the known release structures is the limited reliability with which they will respond to vibrations of a predetermined magnitude.

SUMMARY OF THE INVENTION it is an object of the present invention to provide a release structure for use with a valve or the like which is especially reliable in its ability to respond to seismically induced vibrations of a desired magnitude.

It is another object of the present invention to provide a release structure, the ability of which to respond will not degenerate after a long period of non-use.

A further object is to provide a release structure which is easy to reset after being tripped.

These and other objects are achieved in a release structure having very few component parts, and consequently being of simple and inexpensive construction.

The release structure of the present invention has other objects and features of advantage, some of which are described in more detail herein, and which will become apparent from the accompanying drawing and the description of the preferred embodiments.

The present invention encompasses a release structure for use with a valve or the like which has a movable closure member for opening and closing the valve to control fluid flow therethrough. The release structure includes a pendulum, together with mounting means formed for swinging support of the pendulum, and a movable member connected to the closure member and mounted to move the closure member between its open and closed positions. The closure member and the movable member are biased towards the open or towards the closed position, and latch means is provided to couple the pendulum to the movable member and to retain the movable member in steadfast position against the urging of the biasing means. The latch means is formed to release the movable member for movement toward its other position in response to the biasing means upon vibrationally induced swinging movement of the pendulum. In its broadest aspect the invention embraces the formation of the pendulum mounting means with stop means positioned above the pendulum and formed for pivotal contact with an upper end of the pendulum, wherein the stop means and the upper end have a geometrical configuration of relatively small contact area; the mounting means is further formed to urge the upper end of the pendulum into its position of pivotal contact with the stop means to provide low-friction, universal, unencumbered, pivotal support of the pendulum.

In another of its aspects the invention includes a lever arm formed to transmit the biasing force of the biasing means to the pendulum to urge its upper end into contact with the stop means.

DESCRIPTION OF THE PREFERRED EMBODIMENTS

Figure 1:
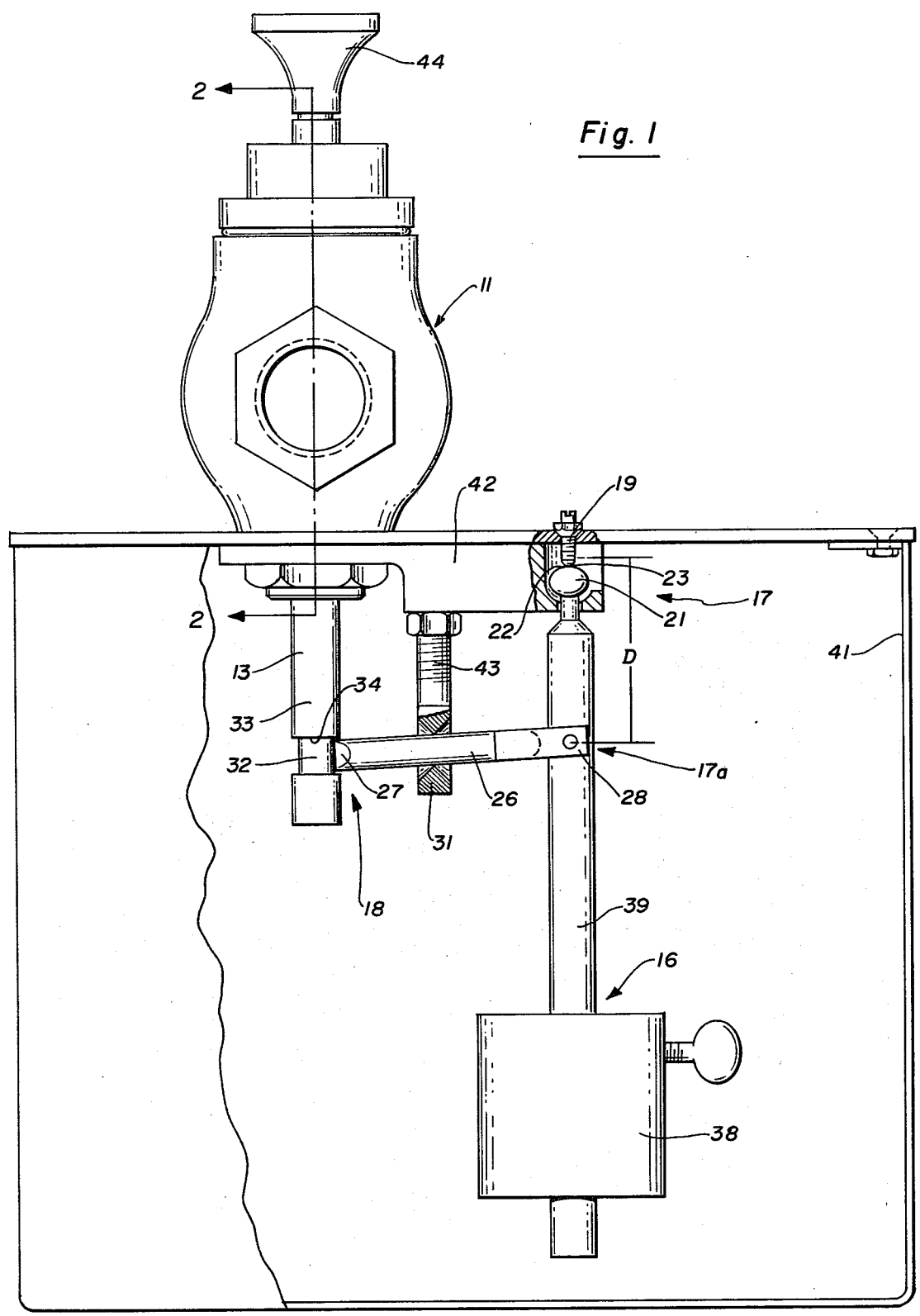
FIG. 1 is an elevational view, partially broken away and partially in cross section, of the valve and release structure constructed in accordance with the present invention.
Figure 2:
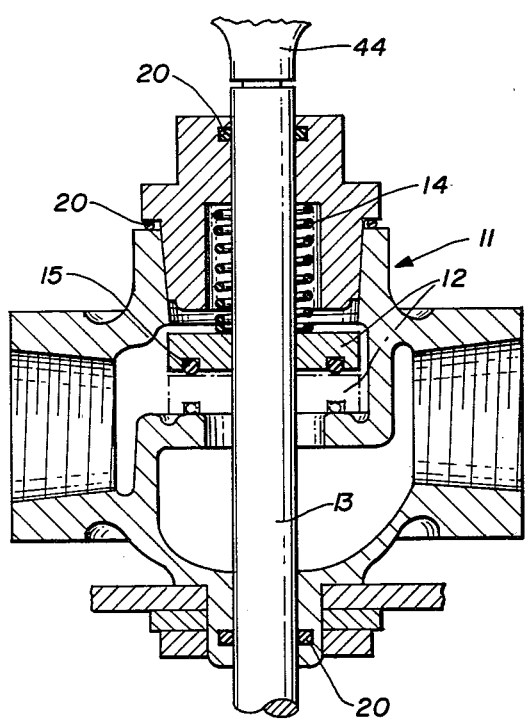
FIG. 2 is a cross-sectional view of a valve adapted for use with the present invention, taken substantially along the plane of line 2—2 in FIG. 1.

The release structure of the present invention in its preferred embodiment is intended for use with a valve or the like, illustrated generally at 11 in FIGS. 1 and 2, which is coupled into a pipeline or other conduit for carrying fluids such as water, gas or steam therethrough, as is commonly found in residential or commercial buildings. Fluid flow is controlled by a closure member 12 which is movable between a first position and a second position. The two positions will generally correspond to an open and a closed position for passage or complete stoppage of the fluid.

In FIG. 2 closure member 12 is illustrated in an open position, the associated closed position being shown in phantom, at which position O-ring 15 seals against the valve seat. Connected to closure member 12 is a movable member 13 which is mounted to move the closure member between its two positions. A biasing means, such as spring 14, is mounted to urge closure member 12 and movable member 13 from one position to the other, say, from the first position to the second position. O-rings 20 (FIG. 2) seal movable member 13 to the valve housing in a manner well known in the art.

The release structure includes a pendulum 16 and mounting means formed for swinging support of the pendulum, as illustrated generally at 17. The release structure further includes latch means 18 coupling pendulum 16 to movable member 13. Latch means 18 is formed to retain movable member 13 in its first position and to release member 13 for movement to its second position in response to biasing means 14 upon vibrationally induced swinging movement of pendulum 16.

Greatly improved reliability of the seismic response of pendulum 16 is provided in the present invention by stop means 19 positioned above pendulum 16 and formed for pivotal contact with an upper end 21 of the pendulum. Stop means 19 and upper end 21 are particularly formed to have a geometrical configuration presenting relatively small contact area. In cooperation with the suprapositioning of stop means 19 to provide the increased sensitivity and reliability of seismic response characteristic of the present invention, mounting means 17 is formed to urge upper end 21 into pivotal contact with stop means 19. In this manner low-friction, universal, unencumbered, pivotal support of pendulum 16 is achieved.

Figure 3:
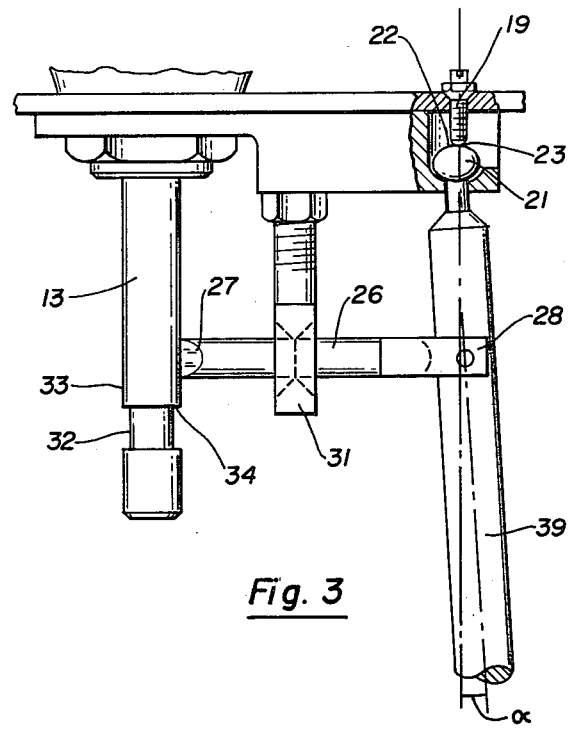
FIG. 3 is a fragmentary elevational view of the release structure in its released configuration, preparatory for reset.

It has been found in valve release structures of the pendulum type known to the prior art that the nature of the pendulum support has a surprisingly important effect on the reproducibility with which the pendulum will cause the latch mechanism to release in response to an applied vibration. In the present invention that reproducibility is enhanced by providing stop 19 and upper end 21 with as small a contact area as possible. Further improvement in the swinging response of the pendulum is achieved when stop means 19 and upper end 21 are formed for rolling engagement over the contact area. In the embodiment of FIG. 3 upper end 21 is formed with a convex uppermost surface 22, and the lower end of stop means 19 has a rounded tip of high curvature 23. The conformation of the surfaces 22 and 23 is such that when the pendulum swings the upper end 21 rolls against the overhanging stop means 19.

For pivotal contact of upper end 21 and stop means 19 it is, of course, necessary that the pendulum be biased upwardly against the stop means. Although this upward bias could be provided by a separate spring mounted solely for that purpose, greater simplicity, hence economy of manufacture, and improved operation are obtained by employing the aforementioned biasing means 14 for this purpose. To this end, mounting means 17 can be adapted as at 17a to include lever means 26 formed to transmit the biasing force of biasing means 14 to pendulum 16 to urge upper end 21 into pivotal contact with stop means 19. In the embodiment of FIG. 1 the lever arm 26 has a first end 27 which is releasably coupled to movable member 13 to provide a latch. A second end 28 of lever arm 26 is coupled to pendulum 6 in spaced relation a sufficient distance beneath upper end 21 so that end 28 will undergo a significant lateral displacement when pendulum 16 swings about its contact point substantially in a plane perpendicular to lever arm 26. Between ends 27 and 28 fulcrum means 31 is provided for both vertical and horizontal motions of ends 27 and 28. In this manner arm 26 functions as a dual lever. First, it urges the upper end of pendulum 16 into pivotal contact with stop means 19 in response to the biasing force exerted on end 27 by biasing means 14. Second, it releases movable member 13 in response to displacement of end 28.

it is necessary for reliable operation of the release structure that the fulcrum 31 introduce a minimum of friction or unwanted play into the release mechanism. A fulcrum suitable for use in the present invention is provided by a knife-edge support, as illustrated in cross section in FIG. 1, surrounding arm 26 on three sides. The knife edge can be conveniently manufactured with a circular opening to receive and completely surround a lever arm of circular cross section passing therethrough. However, for proper functioning of the release structure it is only necessary that the knife-edge embrace the lever arm on three sides to provide a fulcrum for horizontal and vertical motions, and it is in this sense that the word "surround" is hereinafter understood.

Knife-edge 31 and arm 26 are advantageously formed for relative axial movement of the arm through the knife-edge. In cooperation therewith for improved operation arm 26 can be hingedly connected to pendulum 16 to pivot in the vertical plane containing the arm and pendulum.

Figure 4:
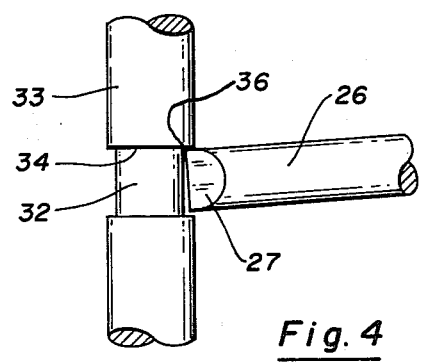
FIG. 4 is an elevational view on an enlarged scale of the latch means in a preferred embodiment of the invention.

To reduce random and uncontrollable impediments to the smooth operation of the release structure, hence to enhance its reliability, the present invention is provided with an especially low-friction latch means to releasably retain movable member 13 against the urging of bias means 14. The latch means is formed by a convex portion of movable member 13 and a lip protruding from the convex portion. A latch member is coupled to pendulum 16 and is engagable with the lip to retain movable member 13 in its first position when the latch member is disposed approximately perpendicularly to the convex portion. In the embodiment of FIG. 1 the latch member is provided by lever arm 26, although a separate and distinct member could be used for this purpose. The convex portion of movable member 13 forming the latch means is provided by a first cylindrical portion 32 of member 13. A second cylindrical portion 33 of member 13 is coaxial with and of slightly larger radius than the first cylindrical portion 32. The second portion 33 terminates in a rim or circular edge 34 projecting from the first portion 32 to form the aforementioned lip. It has been found that more predictable and reliable release of movable member 13 is obtained when end 27 is angularly disposed with respect to member 13 to engage the first cylindrical portion 32 approximately in point contact as at 36 in FIG. 4 and also to engage rim 34 similarly in point contact.

It has been found beneficial in providing for convenient resetting of the release structure after it has been tripped to bias member 26 toward movable member 13. This biasing action is accomplished in the preferred embodiment of FIG. 3 by dimensioning member 26 to maintain pendulum 16 at an angle $\alpha$ to the vertical when closure member 12 and movable member 13 are in their released or second position. Although separate biasing means could be used to achieve this purpose, the use of pendulum 16 to bias latch member 26 provides no additional friction or other restraints on the system.

To adjust the vibrational sensitivity of the release structure, pendulum 16 is formed with a weight 38 which can be positioned on a stem 39 to adjust the effective length of the pendulum.

The pendulum and latch assembly are preferably enclosed by housing 41 for protection against dust and other undesirable influences.

In operation upon the happening of an earthquake or other large impulsive shock, pendulum 16 begins to swing as energy associated with the sudden movement of the valve and piping is transferred to the pendulum. As pendulum 16 swings, end 28 of lever arm 26 is displaced, the magnitude of the displacement for a given angle of swing being determined by the spacing D of end 28 beneath stop means 19. The displacement of end 28 is translated into a displacement of end 27 by the lever action of arm 26 against fulcrum 31. For a critical lateral displacement of end 27, the end will slide out of contact with lip 34, thereby allowing member 13 to move closure member 12 to its second position. The release of end 27 from lip 34 is further aided by convex portion 32 which encourages end 27 to slide along the side of member 13 and out from under lip 34.

To encourage precision release of end 27 from lip 34, end 27 is preferably wedge-shaped with the tapered end of the wedge running vertically. Other finger-like shapes can also be employed to provide low-friction contact and encourage precision release.

The minimum magnitude of disturbance for which the present device will release is determined primarily by the weight and length of the pendulum. The longer the pendulum the more energy will have to be transferred to its swinging motion to produce the same angle of swing and consequently the same lateral displacement of end 28. Thus, the sensitivity of the device can be adjusted by positioning weight 38 on the stem 39. Furthermore, the lateral displacement of end 27 produced by the displacement of end 28 depends on the positioning of fulcrum 31 between the ends. Thus, the sensitivity of adjustment of weight 38 can be enhanced by positioning knife-edge 31 closer to end 27. For adjustable positioning of knife-edge 31 between ends 27 and 28, knife-edge mounting means 42 can be formed with a slot to receive knife-edge support stem 43, which can be retained therein by releasable fastener means such as a wing nut.

For further adjustment in the sensitivity of the device stop means 19 can be provided by a set screw or the like, which can be selectively raised or lowered, thereby raising or lowering the pivot point of pendulum 16. In this manner the angular disposition of end 27 can be adjusted through the lever action of arm 26 with the advantages discussed hereinabove.

Resetting of the mechanism once it has been tripped is particularly convenient in the embodiment of FIG. 1. Movable member 13 merely need be moved manually from its second position to its first. In so doing, end 27 of lever arm 26 slides along cylindrical portion 33 and automatically is displaced inwardly under lip 34 to retain movable member 13 and closure member 12 in their first position. The automatic engagement of end 27 with lip 34 is achieved by the biasing action of pendulum 16 exerted through lever arm 26 when pendulum 16 is cocked at angle α as hereinabove described. To aid in manually resetting the release structure, movable member 13 can be extended through valve 11 and provided with a knob 44 for convenient gripping of member 13.

The preferred embodiment described herein presents the invention in its simplest application. It can well be appreciated by those skilled in the art that by using a compound lever having several fulcrums in place of the simple lever arm 26, the release structure of the present invention can be used to operate a number of valves in a number of different orientations to control both horizontal and vertical fluid flow. It can also be appreciated that although in the illustrated embodiment the release structure is used to close a valve, it can equally well be used to open a valve, say, for diversion of fluid flow on the happening of an earthquake or similar shock. Moreover, the release structure can be used to establish or to break electrical contact, thereby providing a vibrationally sensitive electrical switch. These and other adaptations of the illustrated embodiments apparent to those skilled in the art are considered to be within the scope of the present invention as described by the claims appended hereto.

What is claimed is:

1. A vibrationally actuated release structure for use with a valve or the like having a closure member movable between a first position and a second position for controlling fluid flow therethrough, said release structure including a pendulum, mounting means formed for swinging support of said pendulum, a movable member connected to said closure member and mounted to move said closure member between said first position and said second position, biasing means mounted to urge said closure member and said movable member from said first position to said second position, and latch means coupling said pendulum to said movable member and formed to retain said movable member in said first position and to release said movable member for movement to said second position in response to said biasing means upon vibrationally induced swinging movement of said pendulum, wherein the improvement in said release structure comprises:

said mounting means being formed with stop means positioned above said pendulum and formed for pivotal contact with an upper end of said pendulum, said stop means and said upper end having a geometrical configuration of relatively small contact area; and said mounting means being further formed to urge said upper end into said contact with said stop means to provide low-friction universal unencumbered pivotal support of said pendulum.

2. The structure of claim 1 wherein said stop means and said upper end are formed for rolling engagement over said relatively small contact area.

3. The structure of claim 1 or 2 wherein,
said pendulum is formed with a weight positionable on a stem for adjusting the length of said pendulum and thereby adjusting the sensitivity of said release structure to vibration.

4. A vibrationally actuated release structure for use with a valve or the like having a closure member movable between a first position and a second position for controlling fluid flow therethrough, said release structure including a pendulum, mounting means formed for swinging support of said pendulum, a movable member connected to said closure member and mounted to move said closure member between said first position and said second position, biasing means mounted to urge said closure member and said movable member from said first position to said second position, and latch means coupling said pendulum to said movable member and formed to retain said movable member for movement to said second position in response to said biasing means upon vibrationally induced swinging movement of said pendulum, wherein the improvement in said release structure comprises:

said mounting means being formed with stop means positioned above said pendulum and formed for pivotal contact with an upper end of said pendulum, said stop means and said upper end having a geometrical configuration of relatively small contact area; and said mounting means including a lever formed to transmit the biasing force of said biasing means to urge said upper end into said contact with said stop means to provide low-friction universal unencumbered pivotal support of said pendulum.

5. The structure of claim 4 wherein,
said lever means comprises an arm having a first end releasably coupled to said movable member to provide said latch means and a second end coupled to said pendulum in spaced relation beneath said upper end to produce displacement of said second end when said pendulum undergoes said swinging movement;

and
fulcrum means provided for said arm between said ends for vertical and horizontal motion of said ends, whereby said upper end of said pendulum is urged into said contact by said arm in response to said biasing force exerted on said first end and said movable member is released in response to said displacement of said second end.

6. The structure of claim 5 wherein,
said fulcrum means is provided by a knife-edge surrounding said arm on three sides thereof.

7. The structure of claim 6 wherein,
said knife-edge and said arm are formed for relative axial movement of said arm through said knife-edge.

8. The structure of claim 4 wherein,
said latch means is provided by a convex portion of said movable member and a lip protruding from said convex portion, and a latch member coupled to said pendulum and engageable with said lip to retain said movable member in said first position when said latch member is disposed approximately perpendicularly to said convex portion.

9. The structure of claim 8 wherein,
said movable member has a first cylindrical portion providing said convex portion and a second cylindrical portion coaxial with and of slightly larger radius than said first cylindrical portion, said second cylindrical portion terminating in a rim projecting from said first cylindrical portion to form said lip.

10. The structure of claim 9 wherein,
an end of said latch member is angularly disposed with respect to said movable member to engage said first cylindrical portion approximately in point contact and to engage said rim approximately in point contact thereby providing very low-friction releasable engagement of said latch member with said movable member.

11. The structure of claim 8 wherein,
said latch member is mounted to maintain said pendulum at an angle to the vertical to bias said latch member toward said movable member when said closure member is in said second position.

* * * * *